(12) United States Patent
Maykov et al.

(10) Patent No.: US 8,712,992 B2
(45) Date of Patent: Apr. 29, 2014

(54) METHOD AND APPARATUS FOR WEB CRAWLING

(75) Inventors: Alexey Maykov, Redmond, WA (US); Matthew F. Hurst, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 619 days.

(21) Appl. No.: 12/413,528

(22) Filed: Mar. 28, 2009

(65) Prior Publication Data

US 2010/0250516 A1  Sep. 30, 2010

(51) Int. Cl.
*G06F 7/00* (2006.01)
*G06F 7/08* (2006.01)

(52) U.S. Cl.
USPC .......................... 707/711; 707/709

(58) Field of Classification Search
USPC ................................. 707/709, 710
See application file for complete search history.

(56) References Cited

U.S. PATENT DOCUMENTS

| | | | |
|---|---|---|---|
| 6,351,755 B1 * | 2/2002 | Najork et al. | 715/206 |
| 6,424,966 B1 * | 7/2002 | Meyerzon et al. | 707/610 |
| 7,310,632 B2 * | 12/2007 | Meek et al. | 707/709 |
| 7,725,452 B1 * | 5/2010 | Randall | 707/709 |
| 7,769,742 B1 * | 8/2010 | Brawer et al. | 707/709 |
| 7,899,807 B2 * | 3/2011 | Olston et al. | 707/709 |
| 8,266,134 B1 * | 9/2012 | Dean et al. | 707/709 |
| 2005/0071766 A1 * | 3/2005 | Brill et al. | 715/738 |
| 2007/0100875 A1 | 5/2007 | Chi et al. | |
| 2007/0239701 A1 * | 10/2007 | Blackman et al. | 707/5 |
| 2008/0104113 A1 * | 5/2008 | Wong et al. | 707/104.1 |
| 2008/0208820 A1 | 8/2008 | Usey et al. | |
| 2008/0215607 A1 | 9/2008 | Kaushansky et al. | |
| 2009/0077198 A1 * | 3/2009 | Larsson et al. | 709/217 |
| 2010/0082637 A1 * | 4/2010 | Mishne et al. | 707/748 |

FOREIGN PATENT DOCUMENTS

WO  2008083504 A1  7/2008

OTHER PUBLICATIONS

David Hawking, Web Search Engines: Part 1, Jun. 2006, Computer, pp. 86-88.*
Rose et al., "Cobra: Content-based Filtering and Aggregation of Blogs and RSS Feeds", School of Engineering and Applied Sciences, Harvard University, pp. 29-42, http://www.usenix.org/events/nsdi07/tech/full_papers/rose/rose_html/.
Gomes et al., "The Viuva Negra Crawler", Nov. 2006, http://xldb.fc.ul.pt/daniel/docs/papers/vnRT.pdf.
Joshi et al., "BlogHarvest: Blog Mining and Search Framework", Dec. 14-16, 2006, pp. 1-4, http://www.cse.iitb.ac.in/comad/2006/proceedings/226.pdf.

* cited by examiner

*Primary Examiner* — Ajay Bhatia
*Assistant Examiner* — Miranda Huang
(74) *Attorney, Agent, or Firm* — Steve Spellman; Jim Ross; Micky Minhas

(57) ABSTRACT

A method and system for retrieving data from a webpage is described herein. A scheduler organizes, or rather orders, a group of webpage identifiers according to some predetermined criteria. Based upon this ordering, a fetcher may be configured to fetch data from webpages identified by the identifiers. To promote efficiency and reduce the latency between when a webpage is updated and when the fetcher retrieves data from the webpage, the scheduler may be configured to reorder the identifiers in such a manner that it causes an identifier that was less relevant, and would not have been sent to the fetcher, to become more relevant. In this way, the method and system may be particularly useful for retrieving data related to webpages that are updated frequently, such as social media webpages, for example.

20 Claims, 7 Drawing Sheets

METHOD AND APPARATUS FOR WEB CRAWLING

BACKGROUND

A web crawler (also referred to as a bot, spider, ant, etc.) is typically configured to browse the web in a methodical, automated manner with the goal of acquiring information about content posted to a webpage. The information it acquires may vary depending upon the intended purpose of the information. For example, crawlers that are used in conjunction with search engines may be designed to make a copy of the webpage being crawled so that the search engine may index the webpage. Crawlers may also be used for maintenance checks of a webpage (e.g., making sure links in the page work properly) and/or to collect email addresses or other hyperlinks listed on a webpage.

Unfortunately, the web has more webpages than a crawler is capable of crawling. Additionally, webpages are altered so quickly (e.g., as new content is posted on existing webpages, content is deleted from existing webpages, new webpages are created, etc.) that it is difficult for crawlers to know which webpages to crawl. Therefore, web crawlers are programmed with a list of uniform resource locators (URLs) that identify which webpages the crawler is supposed to crawl. When a webpage from the list is crawled, the URL is added to a second list that contains all of the URLs that have been crawled (e.g., so that the webpage is not crawled again before other webpages are crawled). Additional URLs can be added to the list based upon the content of a crawled webpage (e.g., a URL on a crawled webpage identifies another webpage). The web crawler continuously cross checks the two lists so that the same webpage is not crawled twice. Once all of the webpages on the list have been crawled, the crawler erases the second list and repeats the process.

While current web crawlers are effective, it may be hours if not days before a crawler revisits a webpage. Content that is only relevant for a short period of time, such as content from social media webpages (e.g., social networking sites, blogs, microblogs, etc.), may not be crawled while it is relevant. Therefore, a web crawler that can crawl a large number of webpages while maintaining a low latency between the time of publication on the webpage and the time of collection would be useful.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein a web crawler may be comprised of a scheduler and a fetcher. The scheduler orders a group of webpage identifiers identifying webpages(e.g., URLs) to determine which webpages the fetcher is to fetch data from. The scheduler may be configured to selectively reorder the group of webpage identifiers based upon input the scheduler receives. For example, the scheduler may reorder the webpage identifiers based upon a ping received from a webpage and/or feedback from the fetcher. In this way, the scheduler may adjust the order in which the fetcher visits webpages to reduce the latency period when a webpage is altered and when the fetcher retrieves data related to the alteration.

The fetcher receives relevant identifiers from the scheduler and retrieves data from the webpages identified by the received identifiers. The fetcher may also generate feedback to the scheduler. For example, the fetcher may generate feedback instructing the scheduler to reorder the identifiers in such a way that an identifier identifying a webpage hosted on a host that the fetcher is already in communication with becomes relevant.

Numerous features of the crawler may allow it to crawl a large number of webpages while maintaining a low latency period. For example, the group of identifiers may be predefined so that it may be read into the memory of the scheduler, promoting efficiency. Additionally, the scheduler may order the group such that more relevant webpages and/or the webpages with the more recent changes can be crawled before and/or more often than other webpages, for example. In this way, the crawler may be particularly suited for crawling portions of the web that are rapidly changing, such as social media webpages.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
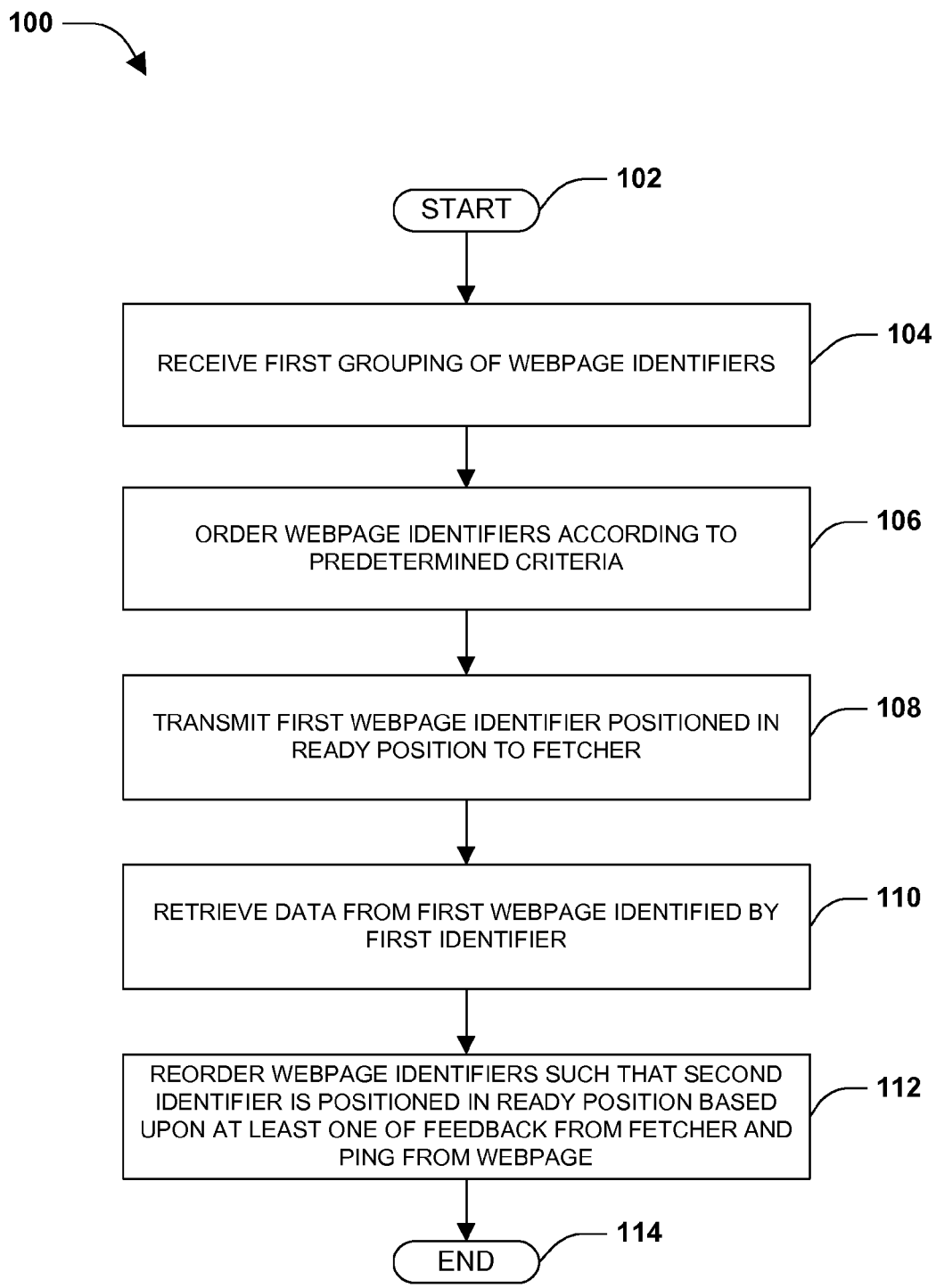
FIG. 1 is a flow chart illustrating an exemplary method of retrieving data from a webpage.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

FIG. 1 illustrates an exemplary method 100 for retrieving data from a webpage. The method 100 begins at 102, and a first grouping of webpage identifiers (e.g., URLs) is received at 104. The first grouping may comprise identifiers that have been predetermined (e.g., by a user and/or a list creation component) to be relevant based upon the crawler's purpose. For example, if the crawler is intended to collect, or rather is targeted at, social media content, the first grouping may comprise identifiers that identify webpages that feature blogs. Likewise, if the crawler is targeted at sports content, the first grouping may comprise identifiers that identify webpages that blog about sports and/or webpages that often comprises sports related articles.

It will be appreciated that since the crawler receives a predefined group, or rather a set of identifiers (e.g., that do not get updated as the crawler crawls pages), the group may be stored into memory for the crawler. Storing the group into memory for the crawler, for example, provides numerous benefits over crawlers that merely create a list of identifiers based upon previously crawled webpages and/or crawlers that are in constant communication with a source external to the crawler that instructs the crawler where to crawl next.

At 106, the webpage identifiers are ordered according to predetermined criteria. It will be understood to those skilled in the art that numerous consideration for ordering webpage identifiers are contemplated. For example, the ordering may take into account how frequently the content of a webpage changes (e.g., a modification frequency), the importance of the webpage, politeness considerations of the crawler (e.g., so that a site does not feel "attacked"), and/or whether the webpage has recently generated a ping. Based upon these and/or other considerations, the webpage identifiers may be order so that the crawler, or rather a fetching portion of the crawler, can retrieve data from webpages in an orderly manner. That is, the order of the webpage identifiers may determine the order in which webpages are to be crawled. In this way a balance may be struck between the crawler's system capacity and the webpages' relative relevance (e.g., the more important webpages may be crawled before the less important webpages).

At 108, a first webpage identifier, positioned in a ready position, is transmitted to a fetcher. That is, the first webpage identifier is transmitted from a first portion of the crawler (e.g., a scheduler) to a second portion of the crawler (e.g., the fetcher) configured to fetch, or rather copy, data from a webpage identified by the first webpage identifier.

It will be appreciated that the terms "ready position" are used herein in a broad sense to refer to a position in the ordered webpage identifiers that identifies, or rather signals, a webpage identifier that is ready to be transmitted to the fetcher. Generally, the webpage identifier in the ready position is an identifier that identifies a more relevant webpage relative to the webpages identified by the other webpage identifiers (e.g., a more important webpage, a webpage that is more likely to contain new content, etc.). Where the webpage identifiers are ordered in a list, for example, the webpage identifier at the top of the list may be considered to be in the ready position. However, it will be appreciated that the ready position may be any position that assists in identifying which webpage identifier is to be transmitted to the fetcher next (e.g., not necessarily the top position).

At 110, data from a first webpage, identified by the first identifier, is retrieved. It will be appreciated that the manner in which the data is retrieved may be similar to those manners used by other crawlers and known to those skilled in the art. The retrieved data may comprise a copy of a portion of the webpage's content (e.g., text, hyperlinks, etc.) and/or information related to the webpage's content (e.g., when the content was altered, who posted the content, etc.).

At 112, the webpage identifiers are reordered such that a second identifier is positioned in the ready position based upon at least one of feedback from the fetcher and a ping from a webpage. That is, webpage identifier that was not moved into the ready position simply because the first identifier was transmitted (e.g., a next identifier) is moved into the ready position because of communication with the fetcher and/or a source external to the crawler (e.g., a webpage). In this way, the second identifier replaces the next identifier in the ready position (e.g., causing the second identifier, rather than the next identifier, to be transmitted to the fetcher when the fetcher has available bandwidth, or rather capacity, to retrieve data from another webpage).

The reordering of webpage identifiers based upon communication may allow the crawler to be dynamic, thus allowing it to respond to (e.g., fetch) changes in webpages quickly. That is, the communication may allow an identifier that is identifying a more relevant webpage (e.g., because the webpage was just updated) to be reordered, and positioned in the ready position, so that there is low latency between when the webpage is updated and when it is crawled.

It will be appreciated that there are numerous manners for determining when/how to reorder the webpage identifiers. In one embodiment, a portion of the crawler (e.g., a scheduler) is configured to listen for, or rather receive, pings from webpages that are identified by identifiers of the first grouping. When the scheduler receives a ping from a webpage (e.g., indicating that the content of the webpage has changed), the scheduler may move the identifier identifying the altered webpage to the ready position.

Unfortunately, some webpages do not issue pings when their content is modified. Additionally, some webpages issue so many pings that a crawler would be unable to crawl other webpages (since the identifiers identifying webpages that have issued pings are moved to the top). Therefore, the list may be reordered according to other considerations (e.g., instead of or in conjunction with pings).

Feedback from the fetcher portion of the crawler is one of the other considerations that may cause the webpage identifiers to be reordered. For example, the fetcher may comprise a parser configured to parse the data retrieved by the fetcher, identify a characteristic of the webpage, and/or make a prediction about the webpage based upon the data retrieved. In one example, the parser identifies the dates of previous alterations and predicts that date of the next alteration (e.g., post) based upon the dates of the previous alterations. This information may be communicated to the scheduler portion of the crawler, for example, and the scheduler may reorder the webpage identifiers in a manner consistent with the prediction (e.g., ranking the webpage identifiers according to when their respective webpages are likely to change).

The feedback from the fetcher may also, or instead, relate to politeness considerations of the fetcher. For example, the fetcher may generate a feedback instruction that instructs a scheduler portion of the crawler, for example, to reorder the grouping such that an identifier identifying a webpage that is hosted by a host that the fetcher is already operably coupled to (e.g., a first host) is moved into the ready position. In this way, the fetcher may crawl webpages faster because it does not have to reestablish a connection with the host at a later time, for example.

It will be understood to those skilled in the art that politeness considerations are currently implemented on crawlers to mitigate the impact a crawler has on a webpage's host and/or to reduce the chances a webpage's host will mistake the crawler as an attack on its server. For example, the fetcher may be instructed to not fetch data from a webpage if the webpage is hosted by a host that the crawler has already crawled twenty times in the past five minutes. While current crawlers may take politeness into consideration when determining whether to crawl a page, current crawlers do not reorder the grouping based upon politeness considerations.

That is, current crawlers to not move a webpage identifier to the ready position because the crawler is already connected to the host associated with the webpage identified by the identifier.

At 114, the method ends.

Figure 2:
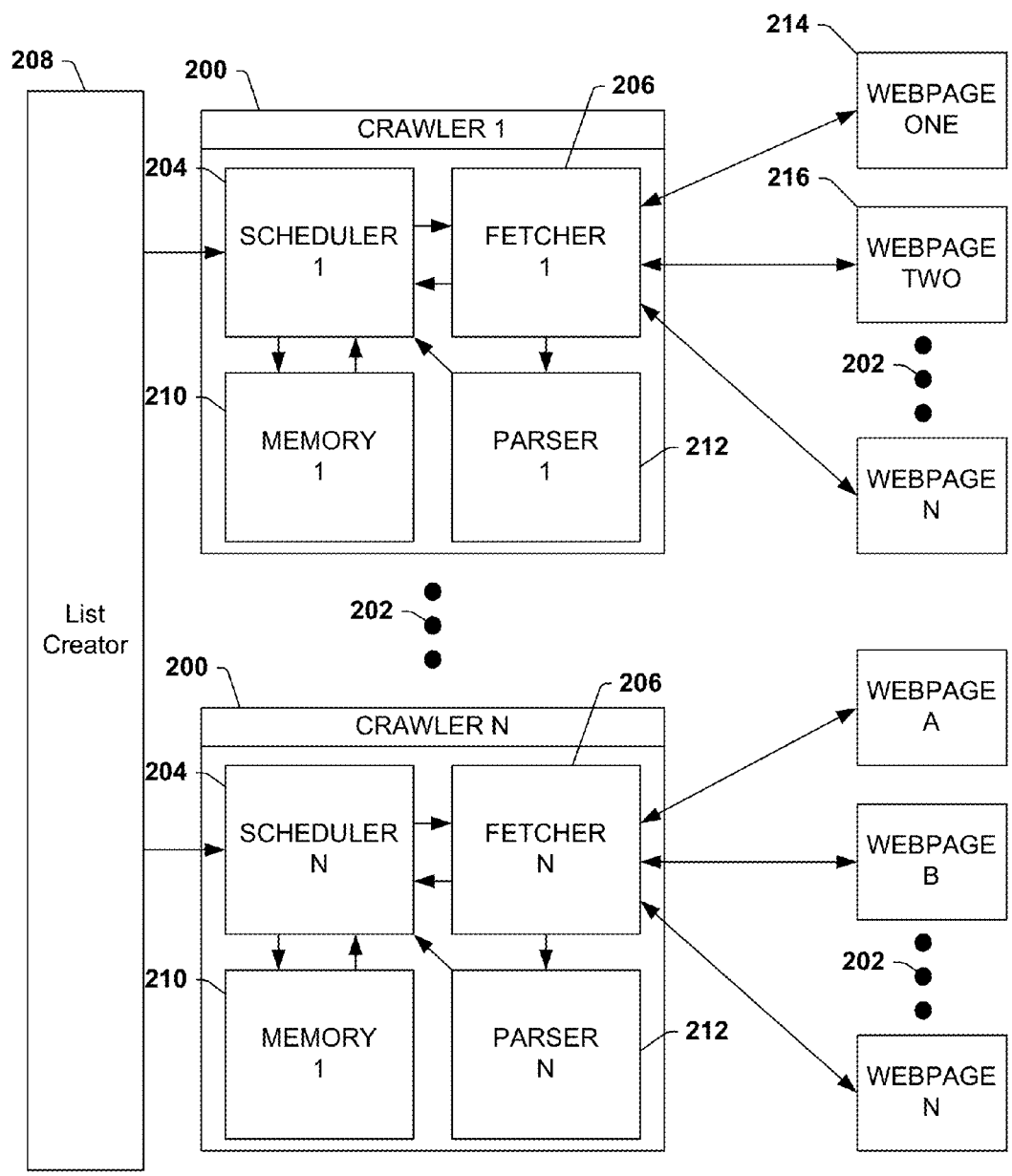
FIG. 2 is a component block diagram illustrating an exemplary system for crawling a webpage.

FIG. 2 illustrates a component block diagram illustrating an exemplary system 200 for crawling a webpage (using method 100 of FIG. 1). The exemplary system may be particularly useful for crawling webpages that post content frequently and/or webpages that comprise content that is relevant for a short period of time (e.g., social media websites). It will be appreciated that the exemplary system may be scaled to meet desired specifications. For example, a large number of crawlers may be used if there is a large number of webpages to be crawled. In the illustrated example, the black dots 202 are representative of scalability.

The system 200 (e.g., a crawler) comprises a scheduler 204 and a fetcher 206. The scheduler 204 is configured to receive a first group of webpage identifiers (e.g., URLs), identifying webpages, from a group creator 208 (e.g., a human operator and/or a computer program) that creates the first group based upon predefined criteria. The first group of identifiers is then ordered by the scheduler 204 to create a schedule for the fetcher 206. In this way, the scheduler 204 acts as a manager that instructs the fetcher 206 where to go to fetch data.

It will be appreciated that once the first group is received by the scheduler 204 it may be unchangeable, or rather, static. That is, additional identifiers may not be added to the group (e.g., based upon webpages crawled by the crawler) and/or identifiers may not be removed from the group until the scheduler 204 is synced with group creator 208. It will be understood to those skilled in the art that the use of a static group may be beneficial over the prior art because it simplifies the acts and increases efficiency. For example, if the group is static, it may be read into a memory storage component 210 operably coupled to the scheduler 204. Reading the identifiers into memory may allow the scheduler 204 to quickly review and/or recall identifiers that the scheduler 204 determines are relevant.

Figure 3:
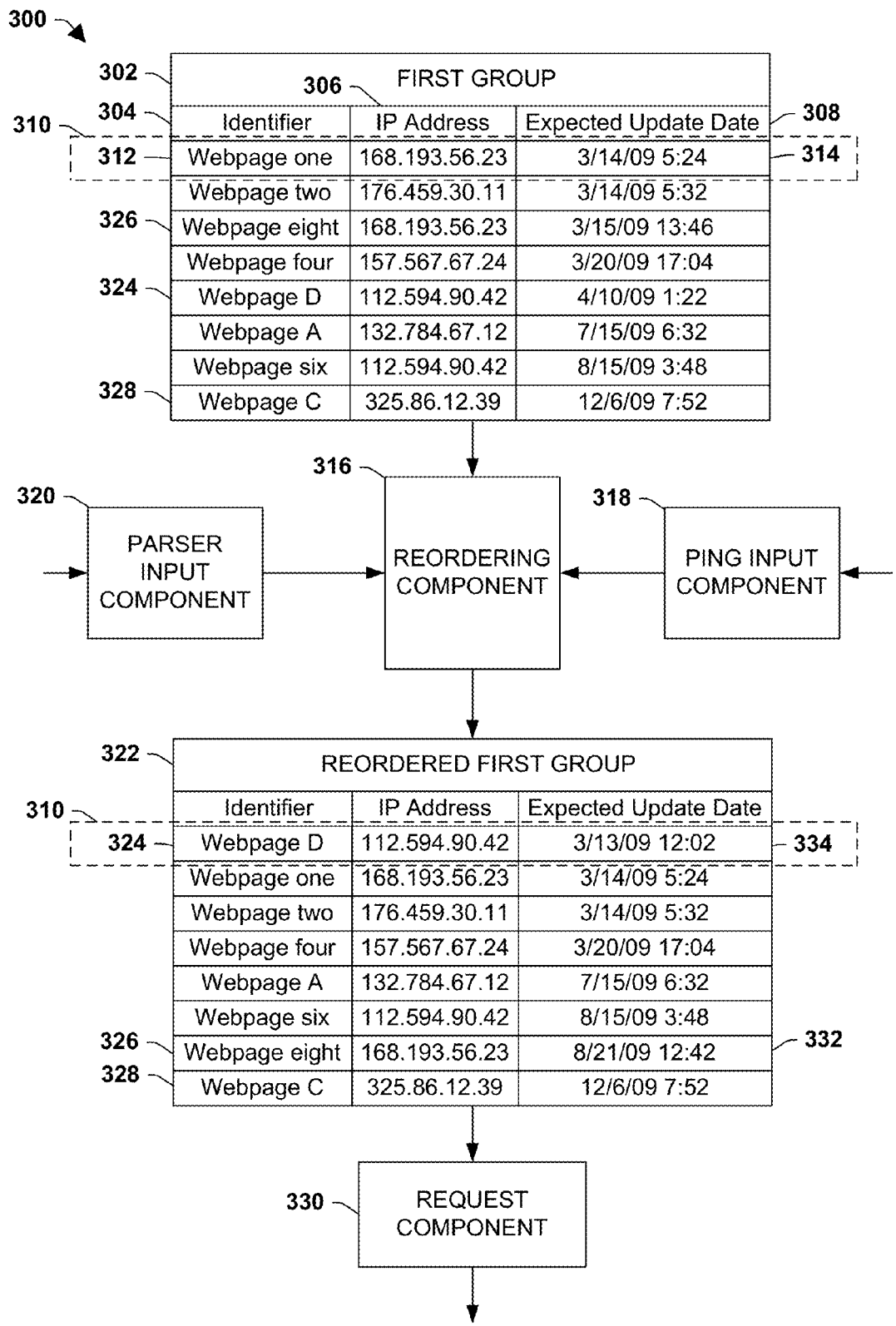
FIG. 3 is a component block diagram illustrating an exemplary scheduler of a crawler.
Figure 4:
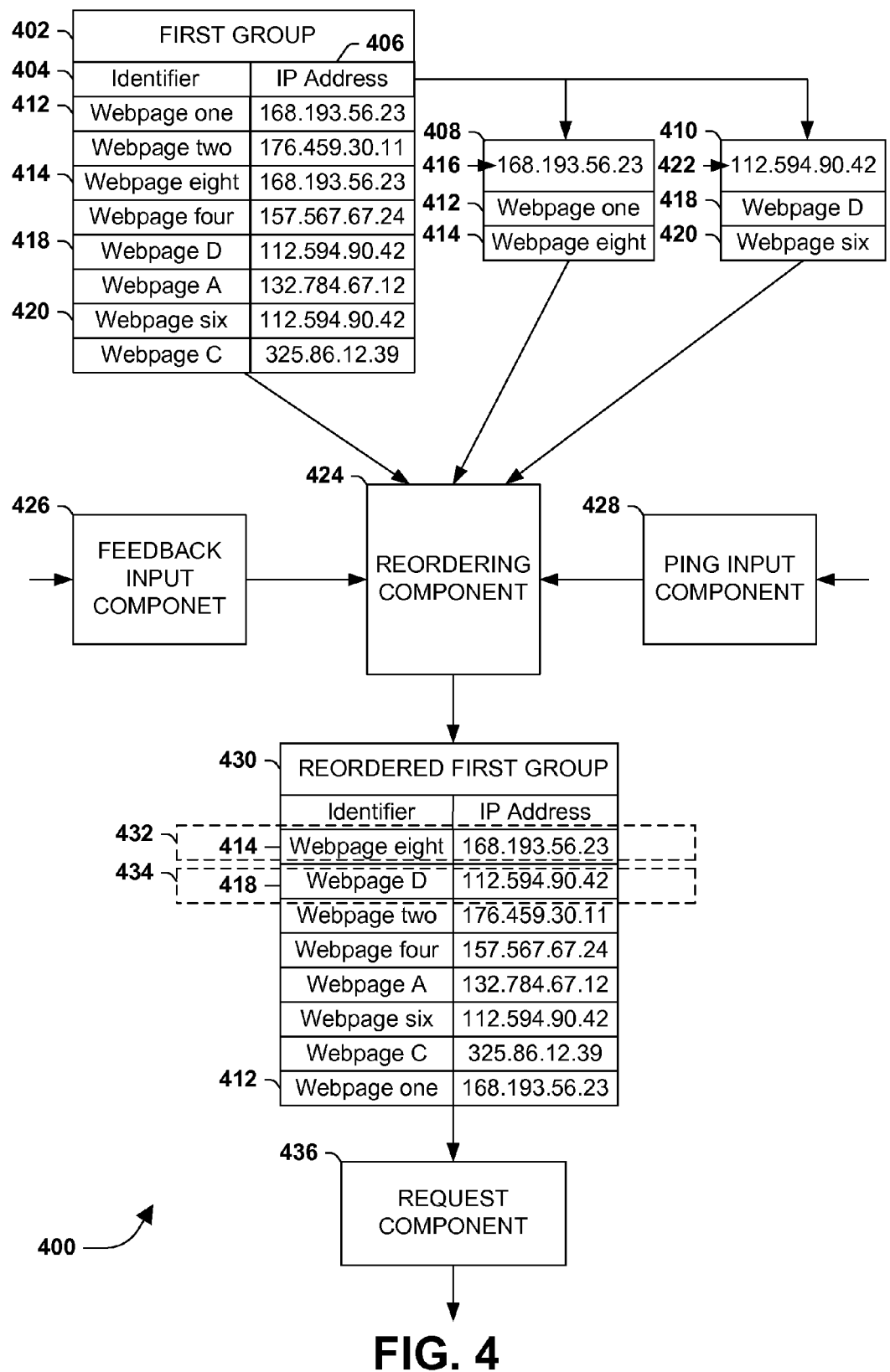
FIG. 4 is a component block diagram illustrating an exemplary scheduler of a crawler.

Webpage identifiers that the scheduler 204 determines to be more relevant (e.g., relative to the other identifiers in the first group) are positioned by the scheduler 204 in the ready position (e.g., a position designated for an identifier ready to be transmitted to the fetcher 206). Because relevancy changes over time, the scheduler 204 is also configured to selectively reorder webpage identifier based upon one or more predetermined considerations. That is, the scheduler 204 may remove an identifier from the ready position and replace it with a second identifier, if the scheduler 204 determines the second identifier has become more relevant than the identifier previously placed in the ready position but not yet transmitted to the fetcher 206. For example, the scheduler 204 may reorder the webpage identifiers based upon feedback from the fetcher 206, a parser 212 and/or a webpage (e.g., 214, 216, etc.). It will be appreciated that several considerations that the scheduler 204 may take into account when determining how to order and/or reorder the identifiers are illustrated in FIGS. 3-4.

When the fetcher 206 has available capacity (e.g., because it has an open port), the scheduler 204 may be configured to issue a request related to a webpage identifier positioned in the ready position. That is, a request related to the webpage identifier that is considered to be more relevant (relative to the other identifiers in the first group), and therefore positioned in the ready position when the fetcher 206 has available capacity, is transmitted to the fetcher 206.

The fetcher 206 is in operable communication with the scheduler 204 and is configured to receive the request and fetch data from a webpage identified by the first identifier. For example, if the first identifier identifies webpage one 214, the fetcher 206 may initiate a communication channel with a host associated with webpage one 214 to retrieve desired data related to webpage one 214 (e.g., a copy of the page, hyperlinks from the page, etc.).

It will be understood to those skilled in the art that as more capacity becomes available (e.g., because the fetcher 206 finishes retrieving data from the webpage one 214) the fetcher 206 may receive a second webpage identifier identifying webpage two, and the fetcher 206 may initialize a connection with a host associated with webpage two 216. In this way, the fetcher may connect with hosts associated with N number of webpages, where N is equal to the number of webpages identified by webpage identifiers in the first group of identifiers.

In one example, the fetcher 206 is also configured to issue feedback to the scheduler 204. For example, the fetcher 206 may notify the scheduler 204 when there are politeness issues (e.g., so that the scheduler 204 does not transmit a request that cannot be fulfilled because of politeness limitations) and/or issue a request to the scheduler 204 if it determines it would increase efficiency, for example, to receive an identifier identifying a webpage that is hosted on the same host as a webpage from which data was very recently retrieved (e.g., because the connection with the host is already initialized).

In one embodiment, the system also includes a parser 212. The parser 212 may be configured to parse the retrieved data and identify a characteristic of the webpage the data is related to. For example, the parser 212 may be configured to predict the date of a next update to the webpage based upon the date(s) of recent updates to the webpage. It will be appreciated that once the parser identifies a characteristic, the parser may generate parsed output that may be transmitted to the scheduler 204 and used as a consideration for reordering the order of the webpage identifiers (e.g., where they are ordered based upon the predicted date of the next change).

FIG. 3 illustrates an example scheduler 300 (e.g., 204 in FIG. 2). Scheduler 300 illustrates a first group 302 of webpage identifiers that have been received by the scheduler 300 from a group creator (e.g., 208 in FIG. 2). Respective webpages are identified by an identifier 304 (e.g., a URL), an IP address of the webpage's host 306, and an expected update date 308 (e.g., based upon a prediction made by the parser 212 of FIG. 2). The identifiers are ordered, or rather arranged, according to their expected update date, wherein a webpage that is expected to be updated sooner (relative to other webpages identified by identifiers in the first group) is positioned in the ready position 310. In the illustrated example, webpage one 312 is in the ready position 310 because the webpage identified by webpage one 312 has an expected update date of Mar. 14, 2009 at 5:24 314, which is sooner than the expected update date of the other webpages.

The scheduler 300 also comprises a reordering component 316. The reordering component 316 is configured to reorder the first group 302 based upon predetermined considerations. In the illustrated example, the reordering component 316 is configured to reorder the first group 302 based upon input received from a ping input component 318 (e.g. configured to receive pings from updated webpages) and input received from a parser input component 320 (e.g., configured to receive predictions from a parser).

Generally, the scheduler 300 may be configured to transmit requests to a fetcher (e.g., 206 in FIG. 2) based upon the order of the identifiers (e.g., the scheduler works its way down the first group 302 of identifiers). However, when the reordering component 316 receives information from the ping input component 318 and/or the parser input component 320, the reordering component 316 may reorder the first group 302 (e.g., as illustrated by the reordered first group 322) based upon the received information. Reordering the first group 302 may cause the scheduler 300 to transmit requests in a different order (e.g., because the identifiers are in a different order). It will be appreciated that the reordering component 316 may be configured to reorder the first group 302 based upon other considerations as well. For example, if the fetcher is backlogged (e.g., the fetcher cannot fetch data as quickly as pings come in), the reordering component 316 may consider secondary considerations, such as the value of fetching content from the webpage (e.g., based upon viewership of the respective webpages) relative to the value of other webpages, when determining the order of identifiers.

In one example, the identifiers may be reordered such that webpage D 324 is in the ready position 310 if a ping (e.g., indicating that an update was made) from a webpage identified by webpage D 324 was received by the ping input component 318. It will be appreciated that in the illustrated example, the ping caused the reordering component 316 to alter the expected update date 334 of the webpage identified by webpage D 324 to the current time, which in turn caused webpage D 324 to be moved into the ready position (e.g., because it has an earlier expected update date). However, the reordering component 316 may use techniques other than altering the expected update date to reorder the identifiers when a ping is received.

Webpage identifiers may also be moved further away from the ready position 310. In the illustrated example, webpage eight 326 is moved to a position further away from the ready position 310 because the parser input component 320 received information (e.g., from a parser) predicting that a webpage identified by webpage eight 326 would not be updated again until Aug. 21, 2009 at 12:42 332. For example, if a fetcher just fetched data from a webpage identified by webpage eight 326 (e.g., because a ping from the webpage identified by webpage eight 326 was received by the ping input component 320 one second earlier) the reordering component 316 may reorder the identifiers based upon the new expected update date 332 of the webpage identified by webpage eight 326.

As illustrated in FIG. 3, the reordering component 316 is not obligated to fetch data from each of the webpages identified by identifiers on the first group 302 before refetching data from a webpage. For example, data from a webpage identified by webpage eight 326 may be fetched twice before a webpage identified by webpage C 328 is fetched once. In this way, the scheduler 300 promotes acquiring data from webpages while it is relevant rather than waiting until data from all of the webpages identified by identifiers in the first group have been acquired. It will be appreciated that waiting until data from all of the webpages has been fetched before revisiting a webpage would make it more difficult to acquire data when it is fresh, or rather, relevant.

The scheduler 300 may also comprise a request component 330 that is configured to issue request to a fetcher (e.g., 206 in FIG. 2) based upon an identifier in the ready position 310 (e.g., webpage D 324). In one example, the fetcher requests another identifier from the scheduler 300 when it has an available port, and the request component 330 generates a request, or rather instruction, that instructs the fetcher which webpage to retrieve data from next (e.g., based upon the order of the identifiers).

FIG. 4 illustrates example scheduler 400 (e.g., 204 in FIG. 2). Scheduler 400 illustrates a first group 402 of webpage identifiers that have been received by the scheduler 400 from a group creator (e.g., 208 in FIG. 2). Respective webpages are identified by an identifier 404 (e.g., a URL), and an IP address of the webpage's host 406. Based upon IP addresses of the webpages' hosts 406, the scheduler 400 may be configured to create a second 408, third 410, etc. group that comprise identifiers identifying webpages hosted on the same host. In the illustrated example, the second group 408 comprises identifiers for webpage one 412 and webpage eight 414 because both identifiers identify webpages hosted on a first host 416 (e.g., 168.193.56.23). Likewise, the third group 410 comprises identifiers webpage D 418 and webpage six 420 because both identifiers identify webpages hosted on a second host 422 (e.g., 112.594.90.42).

The scheduler 400 may also comprise a reordering component 424 (e.g., 316 in FIG. 3) configured to reorder the first group 402 based upon predetermined considerations. In the illustrated example, the reordering component 424 is configured to reorder the identifiers of the first group 402 based upon input received from a feedback input component 426 (e.g., configured to receive feedback from a fetcher) and input received from a ping input component 428 (e.g. configured to receive pings from updated webpages).

Generally, the scheduler 400 is configured transmit requests to a fetcher (e.g., 206 in FIG. 2) based upon the order of the identifiers (e.g., the scheduler works its way down the first group 402 of identifiers). However, when the reordering component 424 receives information from the feedback input component 426 and/or the ping input component 428, the reordering component 424 may reorder the first group 402 according to the information received (e.g., as illustrated by the reordered first group 430). Reordering the first group 402 may cause the scheduler to transmit request in a different order (e.g., because the identifiers are in a different order).

For example, suppose data is fetched from a webpage identified by webpage one 412 (e.g., causing webpage one 412 to be moved to the bottom of the order as illustrated in the reordered first group 430). Since a fetcher (e.g., 206 in FIG. 2) already has established a communication channel with the host 416 of the webpage identified by webpage one 412 (e.g. 168.193.56.23), the fetcher may generate feedback instructing the scheduler 400 to reorder the first group 402 such that an identifier identifying a webpage hosted on the same host 416 is positioned in the ready position 432 (e.g., and therefore may be transmitted to the fetcher). The feedback input component 426 may receive this feedback and relay the feedback to the reordering component 424 which may, in turn, determine whether there are other identifiers identifying webpages hosted on the same host 416. That is, the reordering component 424 may search the second 408, third 410, etc. groups, which group identifiers by their respective webpages' hosts, to determine whether multiple webpages are hosted on host 416. In the illustrated example, webpage eight 414 identifies a webpage hosted on the same host 416 as the webpage identified by webpage one 412, so the reordering component 424 may reorder the identifiers such that webpage eight 414 is positioned in the ready position.

The identifiers may also be reordered based upon input received by the ping input component 428. In the illustrated example, webpage D 418 was moved by the reordering component 424 to a second position 434 in the reordered first group 430 (e.g., so that it may be transmitted to the fetcher sooner than it would have been before the first group 402 was reordered) because a ping was received by the ping input component 428 from a webpage identified by webpage D

418. It will be appreciated that the reordering component 424 may reorder webpage one 412 into the ready position 432 and webpage D 418 into the second position 434 (e.g., rather than vice-versa) based upon secondary considerations if the feedback and a ping are received at substantially the same time. For example, the reordering component 424 may consider which webpage has more viewers (e.g., based upon a list comprising the viewership of each website identified by an identifier on the first group 402) when determining which identifier should be placed in the ready position 432 (e.g., and fetched first) and which identifier should be placed in the second position 434.

The scheduler 400 may also comprise a request component 436 that is configured to issue request to a fetcher (e.g., 206 in FIG. 2) based upon an identifier in the ready position 432 (e.g., webpage eight 414). In one example, the fetcher requests another identifier from the scheduler 400 when it has an available port, and the request component 436 generates a request, or rather instruction, that instructs the fetcher which webpage to retrieve data from next (e.g., based upon the order of the identifiers).

Figure 5:
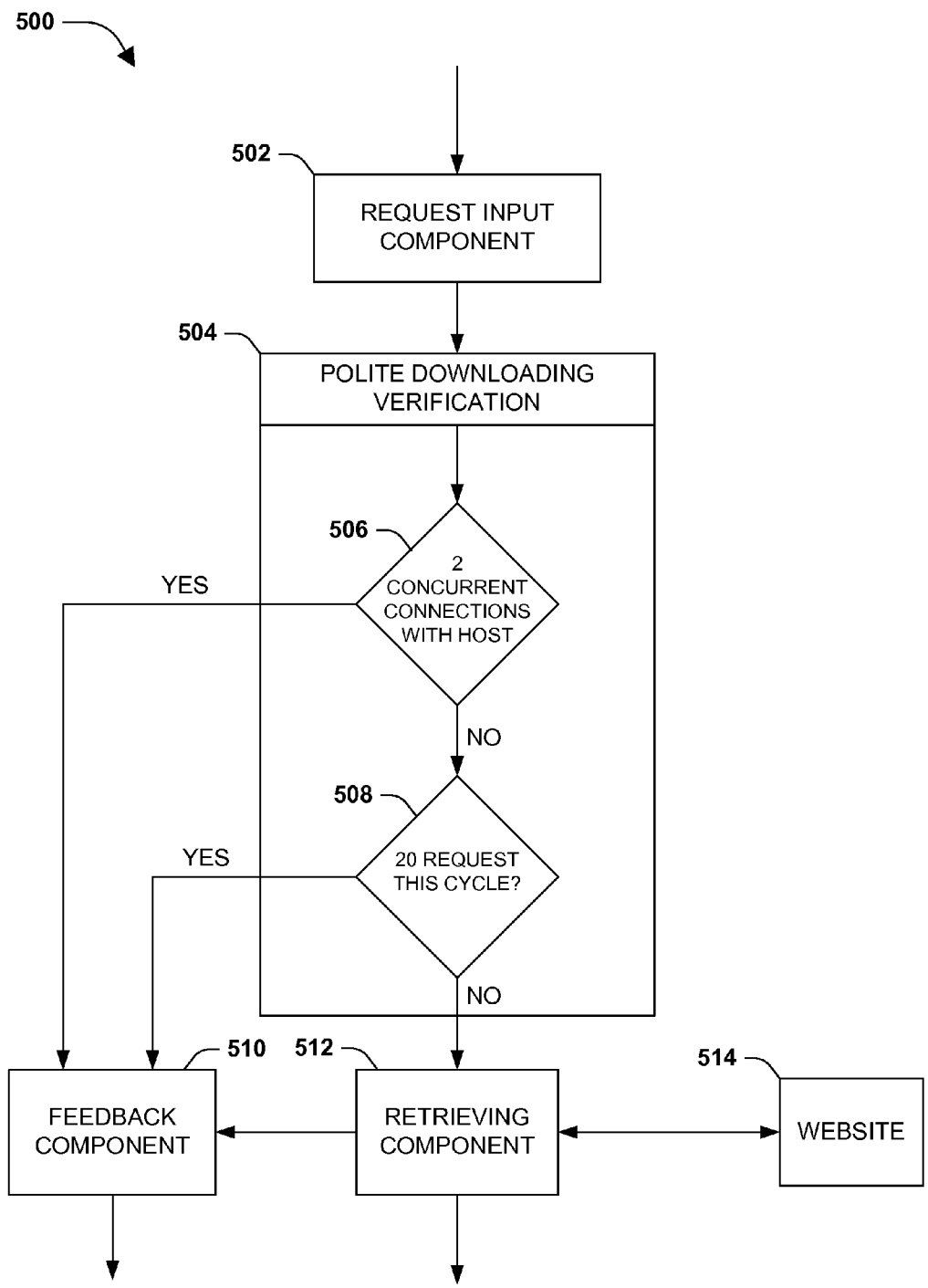
FIG. 5 is a component block diagram illustrating an exemplary fetcher of a crawler.

FIG. 5 illustrates an example fetcher 500 (e.g., 206 in FIG. 2). The fetcher 500 comprises a request input component 502 configured to receive requests from a scheduler (e.g., 204 in FIG. 2) instructing the fetcher 500 where to go to fetch data. Requests received by the request input component 502 are transmitted to a polite downloading verification component 504 that is configured to used predetermined politeness consideration to verify that the fetcher 500 may fetch data from a webpage 514 identified by an identifier in the request.

In the illustrated example, the politeness downloading verification component 504 makes two determinations before the fetcher 500 can retrieve data from the webpage 514. It determines whether there are already two connections with the host that is hosting the webpage identified by the identifier 506. If there are already two connections with the host, the request may not be fulfilled, and a feedback component 510 of the fetcher 500 may generate feedback notifying the scheduler to hold the sent request until a later time when there are not already two connections with the host.

The politeness downloading verification component 504 may also determine whether there has been twenty requests to the webpage's host in a current five minute cycle 508, for example. If twenty requests have already been made in the five minute cycle, the feedback component 510 may generate feedback notifying the scheduler to hold the sent request until the next cycle. In this way, the fetcher reduces that chances that a host will think that a crawler is attacking the host and ban the crawler, for example.

If the politeness downloading verification component 504 determines that there are not already two connections with the host 506 and that there have not been twenty requests to the webpage's host in the current cycle 508, the request may be transmitted to a retrieving component 512 configured to initialize a connection with the webpage's host and retrieve data from the webpage 514 identified by the identifier in the request. Data retrieved from the webpage may be sent to a parser, indexer, etc. for further processing.

It will be appreciated that the retrieving component 512 may be in operable communication with the feedback component 510, and the retrieving component 512 may be configured to notify the feedback component 510 to issue particular instructions to the scheduler. For example, the retrieving component 512 may notify the feedback component 510 to instructing the scheduler to reorder the identifiers in such a way that the next request sent to the fetcher 500 comprises a identifier identifying a webpage hosted on a host that the retrieving component 512 is already in communication with (e.g., so that it does not have to re-initialize a communication channel later). Issuing such feedback may allow the fetcher 500 to be utilized more efficiently because it may not have to spend time and resource connecting to a host that it has already connected to, for example.

Figure 6:
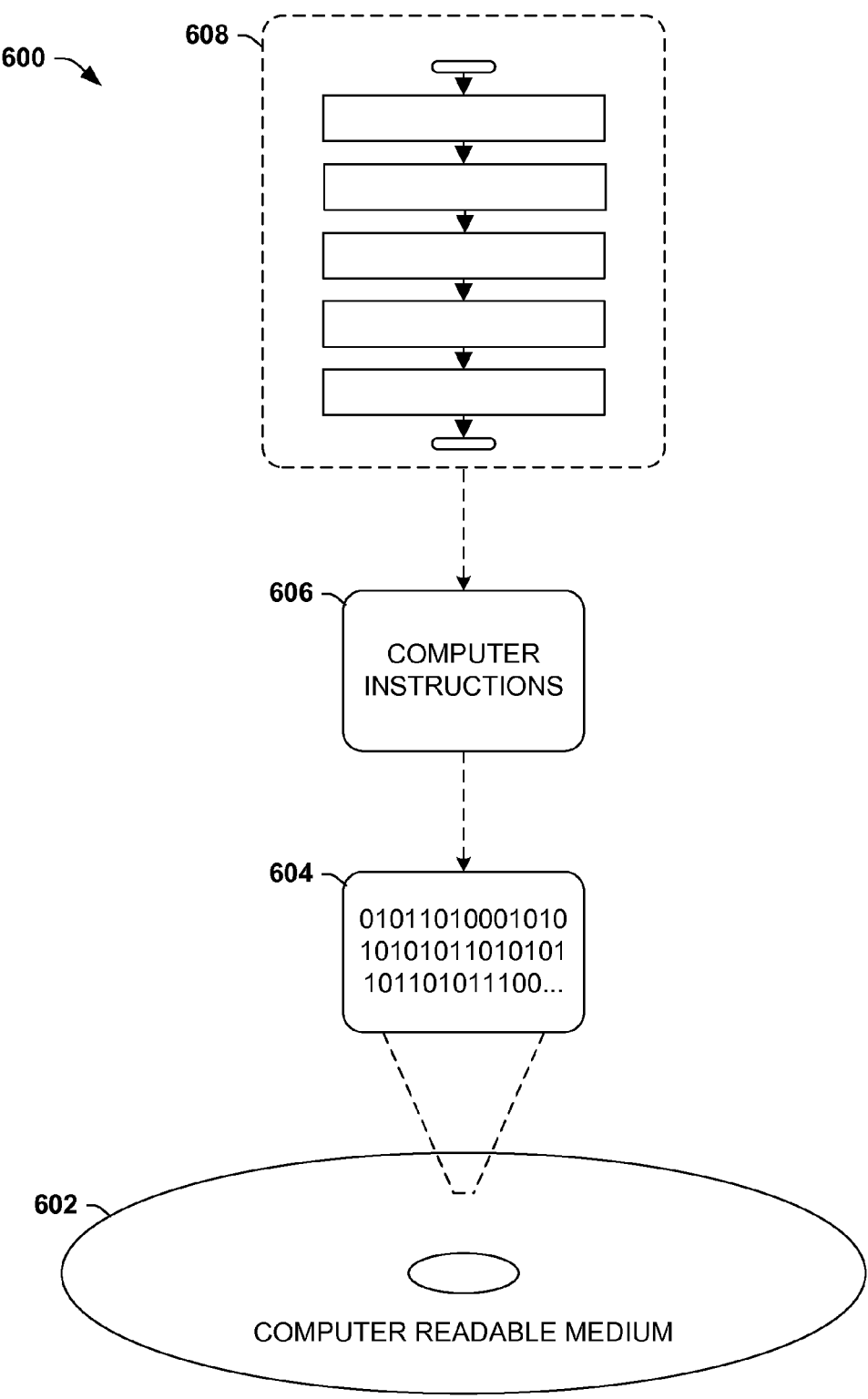
FIG. 6 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 602 (e.g., a CD-R, DVD-R, or a platter of a hard disk drive), on which is encoded computer-readable data 604. This computer-readable data 604 in turn comprises a set of computer instructions 606 configured to operate according to one or more of the principles set forth herein. In one such embodiment 600, the processor-executable instructions 606 may be configured to perform a method 608, such as the exemplary method 1 of FIG. 1, for example. In another such embodiment, the processor-executable instructions 606 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
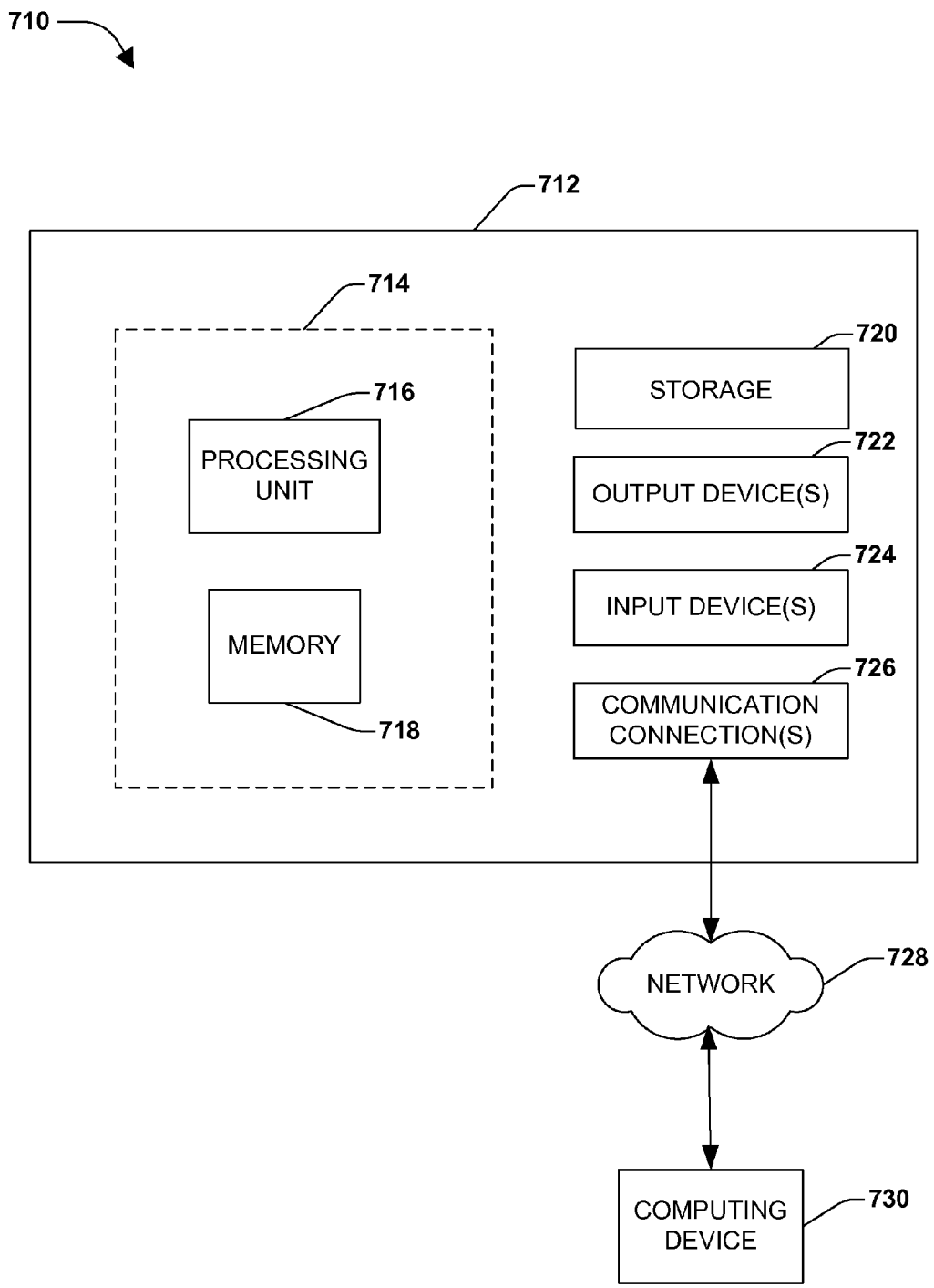
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
    receiving a set of webpage identifiers, a first webpage identifier of the set identifying a first webpage, a second webpage identifier of the set identifying a second webpage, and a third webpage identifier of the set identifying a third webpage;
    performing an ordering of webpage identifiers of the set to derive a first order for crawling the first webpage, the second webpage, and the third webpage, the first order providing for crawling the first webpage before crawling the second webpage and providing for crawling the second webpage before crawling the third webpage, the ordering based at least in part upon:
        viewership information pertaining to at least one of the first webpage, the second webpage, or the third webpage;
        ping information pertaining to a ping received from at least one of the first webpage, the second webpage, or the third webpage; and
        modification frequency information pertaining to at least one of the first webpage, the second webpage, or the third webpage;
    determining, while crawling the first webpage, that the first webpage and the third webpage are associated with a common host and that the second webpage is not associated with the common host, the determining comprising searching the set, while crawling the first webpage, for one or more webpage identifiers that are associated with the common host, the common host based upon an internet protocol address; and
    performing, while crawling the first webpage, a first reordering of the webpage identifiers of the set based at least in part upon the determining to derive a second order, the second order providing for crawling the first webpage and the third webpage at least one of concurrently or contiguously and before crawling the second webpage, at least some of the method implemented at least in part via a processing unit.

2. The method of claim 1, the webpage identifiers of the set comprising a uniform resource locator.

3. The method of claim 1, the performing an ordering comprising:
    predicting a next modification to at least one of the first webpage, the second webpage, or the third webpage based at least in part upon the ping information.

4. The method of claim 1, the performing an ordering comprising:
    predicting a next modification to at least one of the first webpage, the second webpage, or the third webpage based at least in part upon the modification frequency information.

5. The method of claim 1, the performing a first reordering comprising:
    reordering the webpage identifiers of the set based at least in part upon the viewership information.

6. The method of claim 1, comprising inhibiting a crawler from receiving an additional webpage identifier while crawling the webpage identifiers of the set.

7. The method of claim 1, comprising:
    crawling the first webpage, the second webpage, and the third webpage according to at least one of the first order or the second order;
    predicting a next update to at least one of:
        the first webpage as a function of crawling the first webpage,
        the second webpage as a function of crawling the second webpage, or
        the third webpage as a function of crawling the third webpage; and
    at least one of:
        performing the first reordering based at least in part upon the predicting, or
        performing a second reordering of the webpage identifiers of the set to derive a third order based at least in part upon the predicting.

8. The method of claim 1, the first webpage corresponding to a first social media webpage, the second webpage corresponding to a second social media webpage, and the third webpage corresponding to a third social media webpage.

9. The method of claim 1, comprising:
    receiving a ping indicative of a modification to a fourth webpage identified by a fourth webpage identifier of the set; and
    performing a second reordering of the webpage identifiers of the set to derive a third order based at least in part upon the receiving a ping.

10. The method of claim 1, comprising:
    reading the set into memory of a scheduler component configured to perform at least one of the ordering or the first reordering.

11. A computer readable device comprising computer executable instructions that when executed perform a method, comprising:
    receiving a set of webpage identifiers, a first webpage identifier of the set identifying a first webpage, a second webpage identifier of the set identifying a second webpage, and a third webpage identifier of the set identifying a third webpage;
    performing an ordering of webpage identifiers of the set to derive a first order for crawling the first webpage, the second webpage, and the third webpage, the first order providing for crawling the first webpage before crawling the second webpage and providing for crawling the second webpage before crawling the third webpage, the ordering based at least in part upon at least one of:
        viewership information pertaining to at least one of the first webpage, the second webpage, or the third webpage;
        ping information pertaining to a ping received from at least one of the first webpage, the second webpage, or the third webpage; or modification frequency information pertaining to at least one of the first webpage, the second webpage, or the third webpage;

determining, while crawling the first webpage, that the first webpage and the third webpage are associated with a common host, the determining comprising searching the set, while crawling the first webpage, for one or more webpage identifiers that are associated with the common host, the common host based upon an internet protocol address; and performing, while crawling the first webpage, a first reordering of the webpage identifiers of the set based at least in part upon the determining to derive a second order, the second order providing for crawling the first webpage and the third webpage at least one of concurrently or contiguously and before crawling the second webpage.

12. The computer readable device of claim 11, the method comprising:

crawling the first webpage, the second webpage, and the third webpage according to at least one of the first order or the second order;

predicting a next update to at least one of:
the first webpage as a function of crawling the first webpage,
the second webpage as a function of crawling the second webpage, or
the third webpage as a function of crawling the third webpage; and at least one of:
performing the first reordering based at least in part upon the predicting, or
performing a second reordering of the webpage identifiers of the set to derive a third order based at least in part upon the predicting.

13. The computer readable device of claim 12, the third order providing for crawling the second webpage before crawling the first webpage during a subsequent crawl.

14. The computer readable device of claim 11, the performing an ordering comprising:
predicting a next modification to at least one of the first webpage, the second webpage, or the third webpage based at least in part upon the modification frequency information.

15. The computer readable device of claim 11, the first webpage corresponding to a first social media webpage, the second webpage corresponding to a second social media webpage, and the third webpage corresponding to a third social media webpage.

16. The computer readable device of claim 11, the method comprising:
reading the set into memory of a scheduler component configured to perform at least one of the ordering or the first reordering.

17. A system for crawling webpages, comprising:
one or more processing units; and
memory configured to store instructions that when executed by at least one of the one or more processing units perform a method, comprising:

receiving a set of webpage identifiers, a first webpage identifier of the set identifying a first webpage, a second webpage identifier of the set identifying a second webpage, and a third webpage identifier of the set identifying a third webpage;

performing an ordering of webpage identifiers of the set to derive a first order for crawling the first webpage, the second webpage, and the third webpage, the first order providing for crawling the first webpage before crawling the second webpage and providing for crawling the second webpage before crawling the third webpage, the ordering based at least in part upon at least two of:

viewership information pertaining to at least one of the first webpage, the second webpage, or the third webpage;

ping information pertaining to a ping received from at least one of the first webpage, the second webpage, or the third webpage; or modification frequency information pertaining to at least one of the first webpage, the second webpage, or the third webpage;

determining, while crawling the first webpage, that the first webpage and the third webpage are associated with a common host, the common host based upon an internet protocol address; and performing, while crawling the first webpage, a first reordering of the webpage identifiers of the set based at least in part upon the determining to derive a second order, the second order providing for crawling the first webpage and the third webpage at least one of concurrently or contiguously and before crawling the second webpage, at least some of the method implemented at least in part via a processing unit.

18. The system of claim 17, the set not changing as a function of crawling the first webpage, the second webpage, and the third webpage.

19. The system of claim 17, the performing an ordering comprising:
predicting a next modification to at least one of the first webpage, the second webpage, or the third webpage based at least in part upon the modification frequency information.

20. The system of claim 17, the first webpage comprising a first blog, the second webpage comprising a second blog, and the third webpage comprising a third blog.

* * * * *